(12) United States Patent
Bühler et al.

(10) Patent No.: US 11,663,438 B2
(45) Date of Patent: May 30, 2023

(54) DUAL BAND TRANSPONDER AND TEXTILE LABEL WITH DUAL BAND TRANSPONDER

(71) Applicant: TexTrace AG, Frick (CH)

(72) Inventors: Stephan Bühler, Buchs (CH); Jörg Müller, Oberhof (CH)

(73) Assignee: TexTrace AG, Frick (CH)

( * ) Notice: Subject to any disclaimer, the term of this patent is extended or adjusted under 35 U.S.C. 154(b) by 0 days.

(21) Appl. No.: 17/263,381

(22) PCT Filed: Jun. 12, 2019

(86) PCT No.: PCT/EP2019/065343
§ 371 (c)(1),
(2) Date: Jan. 26, 2021

(87) PCT Pub. No.: WO2020/020530
PCT Pub. Date: Jan. 30, 2020

(65) Prior Publication Data
US 2021/0166100 A1 Jun. 3, 2021

(30) Foreign Application Priority Data
Jul. 27, 2018 (DE) .................. 102018212594.5

(51) Int. Cl.
*G06K 19/077* (2006.01)
*G06K 19/02* (2006.01)
*G06K 19/07* (2006.01)

(52) U.S. Cl.
CPC ..... *G06K 19/07767* (2013.01); *G06K 19/027* (2013.01); *G06K 19/0776* (2013.01);
(Continued)

(58) Field of Classification Search
CPC .......... G06K 7/10366; G06K 19/0723; G06K 7/10306; G06K 19/07749;
(Continued)

(56) References Cited

U.S. PATENT DOCUMENTS 6,049,461 A 4/2000 Haghiri-Tehrani et al.
6,446,874 B1 * 9/2002 Elbaz ............... G06K 19/07743
257/E23.125
(Continued)

FOREIGN PATENT DOCUMENTS

DE 102007017864 A1 10/2008
DE 102008022537 11/2008
(Continued)

OTHER PUBLICATIONS

Nayan Sarker et al., "Two Novel Multiband Centimetre-Wave Patch Antennas for a Novel OFDM Based RFID System", Jun. 2018.*
(Continued)

*Primary Examiner* — Thien T Mai (57) ABSTRACT

A dual band transponder comprises a carrier substrate having at least one planar substrate layer. An ultra-high frequency loop antenna is mounted on a first surface of one of the planar substrate layers of the carrier substrate. A high frequency loop antenna is mounted on two opposite surfaces of one of the planar substrate layers of the carrier substrate. The ultra-high frequency loop antenna encloses the high frequency loop antenna in a plane parallel to the at least one planar substrate layer entirely. A textile label includes a textile label substrate and a corresponding dual band transponder mounted onto the textile label substrate.

25 Claims, 2 Drawing Sheets

(52) U.S. Cl.
CPC . *G06K 19/07722* (2013.01); *G06K 19/07786* (2013.01); *G06K 19/07794* (2013.01)

(58) Field of Classification Search
CPC ....... G06K 19/07767; G06K 19/07722; G06K 19/07766; G06K 19/0776; G06K 19/07786; G06K 19/07794; G06K 7/10346; G06K 19/027; G06K 7/10356; G06K 19/07773; H01Q 1/2225; H01Q 7/00; H01Q 9/285; H01Q 1/273; D03D 1/0088; D06H 1/04; A41D 1/002
See application file for complete search history.

(56) References Cited

U.S. PATENT DOCUMENTS

| | | | |
|---|---|---|---|
| 7,924,228 | B2 | 4/2011 | Ochi et al. |
| 8,174,454 | B2 | 5/2012 | Mayer |
| 2003/0098814 | A1* | 5/2003 | Keller, III ................ H01Q 5/40 343/742 |
| 2008/0072423 | A1 | 3/2008 | Finn |
| 2008/0252460 | A1 | 10/2008 | Stobbe |
| 2008/0278391 | A1 | 11/2008 | Mayer |
| 2009/0231139 | A1 | 9/2009 | Heartier |
| 2010/0001079 | A1 | 1/2010 | Martin et al. |
| 2010/0321161 | A1* | 12/2010 | Isabell .................. G06K 19/02 340/10.1 |
| 2011/0084888 | A1 | 4/2011 | Nishioka et al. |
| 2012/0235870 | A1* | 9/2012 | Forster ................ H01Q 13/10 29/601 |
| 2013/0050047 | A1 | 2/2013 | Carr |
| 2014/0246503 | A1 | 9/2014 | Hofer et al. |
| 2015/0097741 | A1* | 4/2015 | Pachler ................ H01Q 21/30 343/742 |
| 2016/0342883 | A1 | 11/2016 | Huhtasalo |
| 2017/0054213 | A1* | 2/2017 | Singh ..................... H01Q 7/06 |
| 2017/0195009 | A1 | 7/2017 | Nagai |
| 2021/0166100 | A1* | 6/2021 | Bühler ............. G06K 19/07722 |

FOREIGN PATENT DOCUMENTS

| | | |
|---|---|---|
| DE | 102008033537 | 4/2015 |
| DE | 102013111027 A1 | 4/2015 |
| JP | 2006-350541 | 12/2006 |
| JP | 2009-278550 | 11/2009 |
| WO | 2007/015353 | 2/2007 |
| WO | 2011/122162 | 10/2011 |

OTHER PUBLICATIONS

Hirsh et al., "Compact Dual-Band Parasitic Dipole Antenna for Harmonic Transponders", Nov. 2015 (Year: 2015).*
Diugwu et al., "Analysis of the Surface Current Distributions in a Dual Band Planar Antenna for Passive RFID Tag", Jan. 2005 (Year : 2005).*
International Preliminary Report on Patentability for International Application No. PCT/EP2019/065343 dated Feb. 2, 2021.
International Search Report and Written Opinion for International Application No. PCT/EP2019/065343 dated Sep. 10, 2019.
Office Action from corresponding Canadian Application No. 3,106,870 dated Jan. 31, 2022.
Office Action from corresponding Indian Application No. 202147006785 dated Jan. 17, 2022.

* cited by examiner

DUAL BAND TRANSPONDER AND TEXTILE LABEL WITH DUAL BAND TRANSPONDER

CROSS-REFERENCE TO RELATED APPLICATIONS

This application is a U.S. National Stage Application under 35 U.S.C. § 371 of International Application No. PCT/EP2019/065343, filed Jun. 12, 2019, titled DUAL BAND TRANSPONDER AND TEXTILE LABEL WITH DUAL BAND TRANSPONDER, which claims priority to German Application No. 102018212594.5, filed Jul. 27, 2018. International Application No. PCT/EP2019/065343 is incorporated by reference herein in its entirety.

FIELD OF TECHNOLOGY OF THE INVENTION

The invention pertains to a dual band transponder, in particular a transponder having combined data transmission functionality in the ultra-high frequency range (UHF) and near-field communication range (NFC). The invention pertains further to a textile label having such a dual band transponder. Moreover, the invention pertains to manufacturing methods for such dual band transponders and textile labels with dual band transponders.

TECHNOLOGICAL BACKGROUND

For the value-added chain in the textile industry it is common practice to use labels with high frequency and/or ultra-high frequency transponders, so-called "radio frequency identification tags" (RFID tags). Such transponders may store data associated with manufacturing, identification, distribution, sales and marketing of the tagged product in a readable fashion.

Near field communication technology (NFC) builds upon RFID technology in general and has been established as international transfer standard for contact-free data exchange. To this end, coils separated by an air gap of a few centimeters are temporarily coupled using the principles of electromagnetic induction in order to be able to transfer data from an NFC transponder to an NFC-enabled reading device by measuring the feedback effect. The textiles sector may utilize such NFC tags for a communication with the retail customer, for example for marketing purposes.

The usage of different wireless data communication technologies for the same product may bring about advantages in different stages of the value-added chain. One possibility entails using two different RFID labels, thereby making the programming and maintenance of the retained data more complicated. Another option is using labels with transponders being able to work in several frequency bands and to make use of different high frequency communication standards. However, by embedding different transponders next to each other in an RFID-enabled label the performance of the individual transponders is usually diminished and the space requirements for the label increase.

Prior art approaches tackling the problem of multi-band enabled high frequency transponders may be found in the documents DE 10 2008 033 537 A1, DE 10 2013 111 027 A1, US 2009/0231139 A1 and US 2016/0342883 A1.

SUMMARY OF THE INVENTION

The invention therefore aims at finding solutions for the miniaturization of dual band transponders, in particular for the application in the value-added chain of textile industries.

According to a first aspect of the invention a dual band transponder comprises at least one planar substrate layer. An ultra-high frequency loop antenna is mounted on a first surface of one of the planar substrate layers of the carrier substrate. A high frequency loop antenna is mounted on two opposite surfaces of one of the planar substrate layers of the carrier substrate. The ultra-high frequency loop antenna encloses the high frequency loop antenna in a plane parallel to the at least one planar substrate layer entirely. A textile label includes a textile label substrate and a corresponding dual band transponder mounted onto the textile label substrate.

According to a second aspect of the invention a textile label comprises a textile label substrate and a dual band transponder according to the first aspect of the invention, the transponder being mounted onto the textile label substrate.

According to a third aspect of the invention a method for manufacturing a textile label, particularly a textile label of the second aspect of the invention, comprises the steps of mounting an ultra-high frequency loop antenna on a first surface of a carrier substrate having at least one planar substrate layer, mounting a high frequency loop antenna on two opposite surfaces of the carrier substrate so that the ultra-high frequency loop antenna encloses the high frequency loop antenna in a plane parallel to the at least one planar substrate layer entirely, coupling an ultra-high frequency transponder chip to the ultra-high frequency loop antenna, coupling a high frequency transponder chip to the high frequency loop antenna, knitting or weaving a dipole antenna in a textile label substrate, and mounting the carrier substrate with the ultra-high frequency loop antenna, the high frequency loop antenna, the ultra-high frequency transponder chip and the high frequency transponder chip onto the textile label substrate.

A basic idea of the invention involves not separating the two antennae for the ultra-high frequency range (UHF) and the high frequency range (HF) from each other in terms of space or attunement, but instead considering the high frequency antenna as functionally integral part of the ultra-high frequency antenna. The respective frequency ranges associated with the two antennas are spaced far enough from each other so that a mutual impairment in the respective receiving and transmitting bands may be avoided. The respective antennae are attuned to each other in such a manner that they may unfold their full performance only in conjunction with the respective other antenna. For example, the ultra-high frequency loop antenna may be tuned to a center frequency of about 800 MHz alone. The high frequency loop antenna may then be placed within the outline of the ultra-high frequency loop antenna in such a way that the ultra-high frequency loop antenna is detuned to a center frequency of about 900 MHz, i.e. the ultra-high frequency loop antenna and the high frequency loop antenna together establish a center frequency in the ultra-high frequency range of 900 MHz together.

In order to shape the antenna structure of the transponder as compact as possible, one of the main ideas of the invention is to fully enclose the high frequency antenna by the ultra-high frequency antenna. Fully enclosing the high frequency antenna by the ultra-high frequency antenna stands for having the electromagnetically effective passage area of the high frequency antenna being entirely covered by the electromagnetically effective passage area of the ultra-high frequency antenna. In other words, all loops of the ultra-high frequency loop antenna encircle the loops and possibly other antenna portions of the high frequency loop antenna in such a way that no antenna part of the high frequency loop antenna extends beyond the effective antenna area of the ultra-high frequency loop antenna in the plane of the carrier substrate.

As a result, the dimensions of the resulting nested antenna structure may be limited to about 13×13 mm, i.e. to less than 170 mm². Thereby, a dual band transponder with little space requirements may be established, being particularly suited for compact textile labels. Specifically implementing the high frequency loop antenna on two surface sides of a carrier substrate or a substrate layer of a carrier substrate, respectively, guarantees that the total length of the high frequency loop antenna is long enough, the space requirement for the high frequency loop antenna in the plane of the substrate layers of the carrier substrate, however, staying low enough that the ultra-high frequency loop antenna may entirely enclose the high frequency loop antenna.

Advantageous embodiments and variations may be found in the further dependent claims as well as in the specification taking into account the drawings.

According to some embodiments of the dual band transponder of the invention, the carrier substrate may comprise at least two planar substrate layers. In some of these embodiments the ultra-high frequency loop antenna may be mounted on a first side of a first one of the at least two planar substrate layers of the carrier substrate. In some of these embodiments the high frequency loop antenna may be mounted on two opposite sides of a second one of the at least two planar substrate layers of the carrier substrate.

According to some further embodiments of the dual band transponder of the invention, the dual band transponder may comprise first interlayer connection elements leading through the second one of the at least two planar substrate layers of the carrier substrate and electrically conductively connecting parts of the high frequency loop antenna on the first side of the second one of the at least two planar substrate layers of the carrier substrate to parts of the high frequency loop antenna on the second side of the second one of the at least two planar substrate layers of the carrier substrate. The number of interlayer connection elements may depend on the number of antenna elements of the high frequency loop antenna on both sides of the carrier substrate. For example, two separate interlayer connection elements may be implemented in vias in the carrier substrate essentially perpendicular to the planar extension of the carrier substrate.

According to some further embodiments of the dual band transponder of the invention, the dual band transponder may further include second interlayer connection elements leading through the first one of the at least two planar substrate layers of the carrier substrate.

According to some further embodiments of the dual band transponder of the invention, the dual band transponder may further include a dual band transponder chip coupled to the ultra-high frequency loop antenna and the high frequency loop antenna. A dual band transponder chip may in this regard be a chip which is operable in both the ultra-high frequency range as well as in the high frequency range and which supports different transmission protocols for the different frequency ranges.

According to some alternative embodiments of the dual band transponder of the invention, the dual band transponder may further include an ultra-high frequency transponder chip coupled to the ultra-high frequency loop antenna, and a high frequency transponder chip coupled to the high frequency loop antenna. The ultra-high frequency transponder chip and the high frequency transponder chip may in this regard work in different frequency ranges and may be configured according to different data transmission protocols such as RAIN RFID and NFC. The ultra-high frequency transponder chip and the high frequency transponder chip may be assembled in two different processes. Hereby, the size of the thermode may be 8 mm so that it is advantageous that the lateral spacing of the ultra-high frequency transponder chip and the high frequency transponder chip may be set to at least 8 mm in order to have the thermode for the second assembly process no longer touch the already assembled chip.

According to some further embodiments of the dual band transponder of the invention, the dual band transponder may further include second interlayer connection elements leading through the first one of the at least two planar substrate layers of the carrier substrate, the dual band transponder chip or the ultra-high frequency transponder chip being coupled to the ultra-high frequency loop antenna by means of the second interlayer connection elements.

According to some further embodiments of the dual band transponder of the invention, the second interlayer connection elements may further lead through the second one of the at least two planar substrate layers of the carrier substrate.

According to some further embodiments of the dual band transponder of the invention, the dual band transponder may further include an adhesive layer applied between the first one of the at least two planar substrate layers of the carrier substrate and the second one of the at least two planar substrate layers of the carrier substrate. The dual band transponder chip or alternatively the ultra-high frequency transponder chip and the high frequency transponder chip may in this regard be arranged in the adhesive layer.

According to some alternative embodiments of the dual band transponder of the invention, the carrier substrate may comprise exactly one planar substrate layer. In this case, the ultra-high frequency loop antenna and the high frequency loop antenna may be mounted at the side surfaces of the exactly one planar substrate layer.

According to some further embodiments of the dual band transponder of the invention, interlayer connection elements may be leading through the exactly one planar substrate layer. Thereby, the ultra-high frequency loop antenna and the high frequency loop antenna may be coupled to a dual band transponder chip.

According to some alternative embodiments of the dual band transponder of the invention, interlayer connection elements may be leading through the exactly one planar substrate layer so that the ultra-high frequency loop antenna is coupled to a ultra-high frequency transponder chip, and the high frequency loop antenna is coupled to a high frequency transponder chip.

According to some further embodiments of the dual band transponder of the invention, the ultra-high frequency loop antenna and the high frequency loop antenna may be attuned to each other so that the operability of the ultra-high frequency loop antenna would be diminished if not for the presence of the high frequency loop antenna.

According to some further embodiments of the dual band transponder of the invention, the surface area of the area of the dual band transponder in the plane of the planar substrate layers of the carrier substrate is less than 170 mm².

According to some embodiments of the textile label of the invention, the textile label may include a dipole antenna knitted or woven into the textile label substrate. Here, in some of the embodiments, the ultra-high frequency loop antenna may couple inductively to the dipole antenna.

According to some further embodiments of the textile label of the invention, the dual band transponder may be coated with a textile transfer adhesive and adhered the textile label substrate via the textile transfer adhesive in a wash-proof manner.

According to some further embodiments of the textile label of the invention, the carrier substrate of the dual band transponder may comprise at least one of the materials from the group of polyethylene terephthalate (PET), polyimide (PI), FR4 (compound material of glass fiber fabric and epoxy resin) and polyether ether ketone (PEEK). Here, the dual band transponder may generally be implemented as laminate having multiple layers, depending on the requirements regarding washability, water tightness and/or chemical resistance against materials such as sweat or detergents.

According to some further embodiments of the textile label of the invention, the spacing between the ultra-high frequency loop antenna and the high frequency loop antenna may be at least 0.8 mm. The ultra-high frequency transponder chip and the high frequency transponder chip may be assembled in two separate processes. In this regard, the size of the thermode may be 8 mm so that it is advantageous that the lateral spacing of the ultra-high frequency transponder chip and the high frequency transponder chip may be set to at least 8 mm in order to have the thermode for the second assembly process no longer touch the already assembled chip.

According to some embodiments of the method of the invention, an identification code for the ultra-high frequency transponder chip may be programmed in a memory of the high frequency transponder chip. According to some embodiments of the method of the invention, an identification code for the high frequency transponder chip may be programmed in a memory of the ultra-high frequency transponder chip.

The implementations and variations discussed above may be, as appropriate, combined in arbitrary manner. Further possible implementations, variations and embodiments of the invention comprise not explicitly shown combinations of features of the embodiments of the invention as discussed above and below. Specifically, a person skilled in the art will also include individual aspects as improvement or addition to the respective basic form of the invention.

BRIEF SUMMARY OF THE DRAWINGS

The present invention will be described in more detail with reference to the accompanying drawings showing several embodiments in which.

The accompanying drawings are included to provide a further understanding of the present invention. The drawings illustrate the embodiments of the present invention and together with the description serve to explain the principles of the invention. Other embodiments of the present invention and many of the intended advantages of the present invention will be readily appreciated by reference to the drawings. The elements of the drawings are not necessarily drawn to scale relative to each other. Terminology denoting orientation such as "top", "bottom", "left", "right", "over", "under", "horizontal", "vertical", "front", "back" and other terms only serve for purposes of explanation and are not intended to limit the invention to specific implementations as shown in the drawings.

Like reference numerals in the figures of the drawings designate corresponding similar parts having the same function and the same effects, unless noted otherwise.

DETAILED DESCRIPTION OF EXEMPLARY EMBODIMENTS

RFID transponder within the meaning of the present invention are electronic modules which basically include an electronic memory chip and an antenna coupled to the memory chip and integrated into the module. RFID transponder may emit and receive electromagnetic signals in different frequency ranges, for example in the range of between 125 kHz ("low frequency", LF) and 5.8 GHz ("super-high frequency", SHF). Depending on the desired frequency band, the implementation form of the integrated antenna may be chosen. Specific importance is assigned to frequency ranges around 13.56 MHz ("high frequency", HF) and between 860 MHz to 960 MHz ("ultra-high frequency", UHF).

UHF frequency bands may for example be used in logistics applications since those channels may exhibit a higher access and readout range than HF channels. Frequently, the form of the antenna and the size of the antenna may be suitably tailored in order to guarantee a desired access and readout range, resilience against interferences and external influences as well as resilience against interferences of RFID transponders among each other. An air interface may be established by means of an electromagnetic field between a reading device and the integrated antenna of the RFID transponder which may serve to exchange data wirelessly and by using predefined data exchange protocols between the memory chip of the RFID transponder and a processor of the reading device.

RFID transponders may be manufactured using a pre-processing stage, so-called inlays. Inlays merely consist of chips and antennae mounted onto a carrier substrate. The inlays may then be equipped with associated housings or protective coatings in order to obtain a transponder module which is resilient to external influences and sufficiently isolated against metallic objects.

Dual band transponders within the meaning of the present disclosure are RFID transponders which are able to transmit and receive data on at least two different frequencies or in two different frequency ranges, respectively. In that respect, dual band transponders may be operable in particular in the high frequency regime at several MHz such as at 13.56 MHz as well as in the ultra-high frequency regime at several hundred to thousand MHz such as between 860 and 950 MHz. Near-field communication technology (NFC) denotes an RFID technology based on the principles of inductive coupling and working at a reading distance on the order of centimeters. NFC works in the high frequency regime detailed above at 13.56 MHz and with a data transmissions rate of 424 kBit per second at maximum. NFC is standardized internationally, for example in ISO 18092, ECMA 340 and ETSI TS 102 190.

Figure 1:
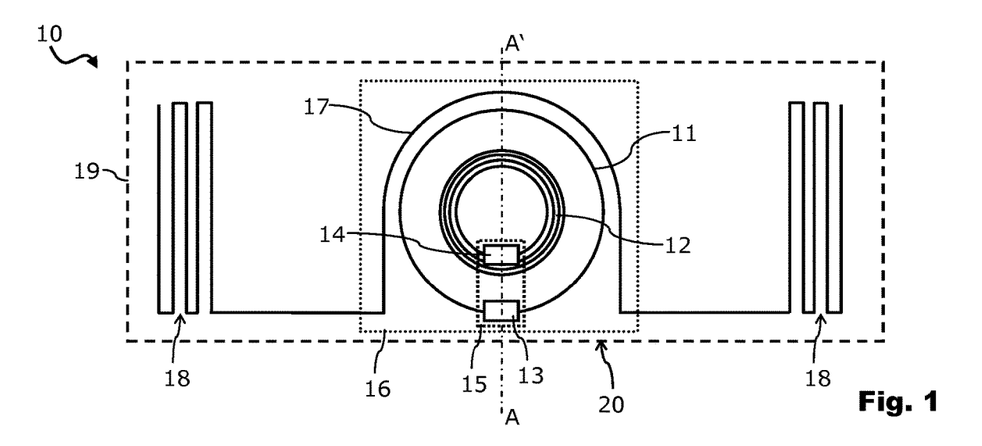
FIG. 1 shows a textile label with a dual band transponder mounted thereon in diagrammatic plan view according to an embodiment of the invention.

FIG. 1 shows a textile label 10 with a dual band transponder 20 mounted thereon in schematical plan view. The textile label 10 includes a textile label substrate 19, for example made from a knitted or woven textile fabric. The textile label 10 may for example have an essentially rectangular outer contour and may be provided for sewing or gluing into a piece of clothing. A dipole antenna is knitted or woven into the textile label substrate 19, for example from an electrically conductive warp thread or weft thread. The dipole antenna is used for signal transmission in the ultra-high frequency far-field. In that regard, the dipole antenna may include two elongated arms having a loop antenna 17 open to one side and lying in the center of the textile label substrate 19. Two extensions 18 having a serpentine pattern may be attached to the two elongated arms of the dipole antenna. When folding dipole antenna arms to meanders or fractal structures a good compromise between maintaining desired electrical properties and simultaneously limiting the dimensions of the dipole antenna in a space-saving manner may be obtained.

A dual band transponder 20 is mounted on the textile label substrate 19, for example centrally over the loop element 17 of the dipole antenna of the textile label substrate 19. The dual band transponder 20 may for example be coated on its bottom side with a textile transfer adhesive 3. This textile transfer adhesive 3 ensures a permanent adhesion of the dual band transponder 20 to the textile label substrate 19. In particular, the textile transfer adhesive 3 may be selected such that the textile label 10 may be washable multiple times without the connection between the dual band transponder 20 and the textile label substrate 19 coming loose.

The dual band transponder 20 generally includes a carrier substrate 16 onto which an ultra-high frequency loop antenna 11 and a high frequency loop antenna 12 are mounted. The ultra-high frequency loop antenna 11 and the high frequency loop antenna 12 are arranged in such a way that the ultra-high frequency loop antenna 11 entirely encloses the high frequency loop antenna 12 in a plane parallel to the latitudinal area of the carrier substrate 16, i.e., the parts of the high frequency loop antenna 12 in the top view of FIG. 1 do not extend beyond the outer contour of the ultra-high frequency loop antenna 11.

The ultra-high frequency loop antenna 11 may for example include a single loop, but may also include multiple concentrically and helically arranged loops. Similarly, the high frequency loop antenna 12 may include multiple concentrically and helically arranged loops. The outline of the individual loops may be circular, as illustrated in FIG. 1 exemplarily. It may also be possible to select other loop forms such as rectangular with rounded corners, egg-shaped or hybrids thereof.

The ultra-high frequency loop antenna 11 and the high frequency loop antenna 12 are attuned to each other in such a manner that the operability of the ultra-high frequency loop antenna 11 would be diminished if not for the presence of the high frequency loop antenna 12. In other words, the electromagnetic influences of the two loop antennae 11 and 12 on each other are already taken into account in the design phase in order to obtain the full performance of both loop antennae 11 and 12 only when they are both present in the dual band transponder 20. By nesting the loop antennae 11 and 12, the surface area of the extent of the dual band transponder 20 in the plan view of FIG. 1 may amount to less than 170 mm², for example being limited to a square area of 13 mm×13 mm.

The ultra-high frequency loop antenna 11 is arranged in such a manner that it is able to inductively couple into the loop element 17 of the dipole antenna. The shape of the dual band transponder 20 is selected to obtain a coupling section of the ultra-high frequency loop antenna 11 to the loop element 17 of the dipole antenna which is as long as possible.

Different exemplary variations for the implementation of a dual band transponder 20 being able to be mounted to the textile label substrate 19 of FIG. 1 for the formation of a textile label 10 are illustrated in FIGS. 2A to 2F. It should be understood that individual features of the variations of FIGS. 2A to 2F may be combined with each other in order to obtain further (not explicitly illustrated) variations of a dual band transponder 20.

The carrier substrate 16 may include at least one planar substrate layer and may be made from one material or different materials. Exemplary materials and combinations of materials are polyethylene terephthalate (PET), polyimide (PI), FR4 and polyether ether ketone (PEEK). The carrier substrate 16 may additionally be provided with a multi-layer laminate having PET sheets, curing adhesives and/or pressure-sensitive adhesives (PSA) in order to protect the carrier substrate 16 and the circuit elements mounted thereon against washing cycles or other treatment steps usually performed for textiles and to maintain the proper functioning of the transponder.

Figure 2A:
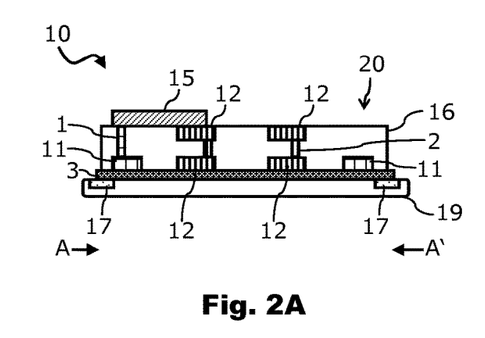
FIGS. 2A to 2F show diagrammatic views of cross-sections in the area of the dual band transponder of FIG. 1 along the cut line A-A' according to various possible embodiments of the invention.
Figure 2B:
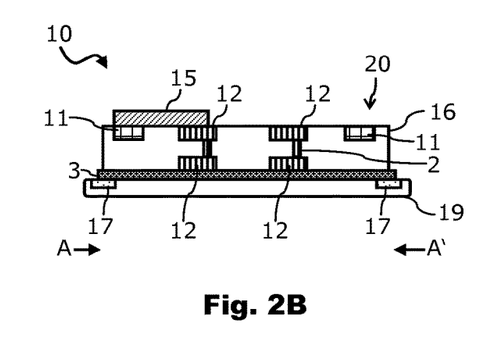
Figure 2C:
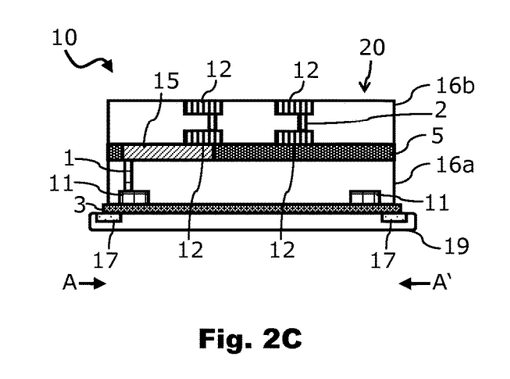
Figure 2D:
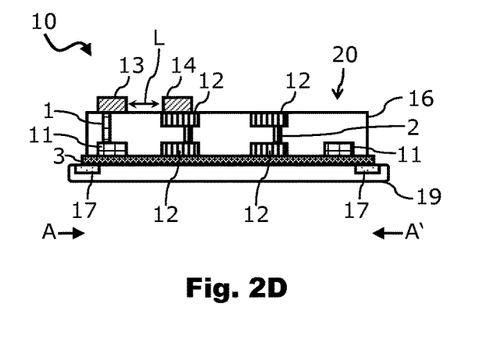
Figure 2E:
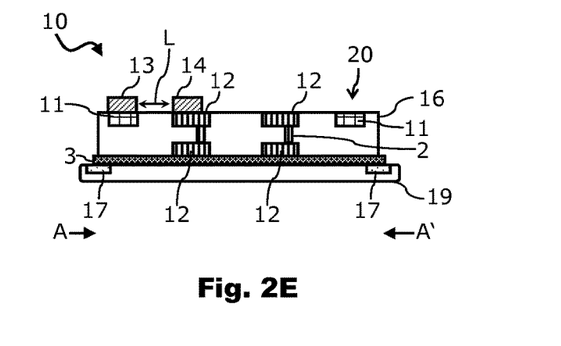

As shown in the FIGS. 2A, 2B, 2D and 2E, the carrier substrate 16 may consist of exactly one planar substrate layer. The ultra-high frequency loop antenna 11 may in this context (as illustrated in FIGS. 2A and 2D) be mounted on the bottom side of the planar substrate layer or (as illustrated in FIGS. 2B and 2E) on the top side of the planar substrate layer. The high frequency loop antenna 12 is mounted on both side surfaces of the exactly one planar substrate layer and its constituents on both sides may be electrically conductively coupled to each other by means of interlayer connection elements 2 which are implemented through the substrate layer. Depending on which side the ultra-high frequency loop antenna 11 is mounted onto, further interlayer connection elements 1 may be implemented through the exactly one substrate layer in order to guarantee an electrically conductive coupling to the ultra-high frequency loop antenna 11 from the respective other side surface.

The ultra-high frequency loop antenna 11 and the high frequency loop antenna 12 may in each case be manufactured from electrically conductive layers for example aluminum or copper, for example by mask etching, PVD or CVD.

As shown in FIGS. 2A to 2C, the ultra-high frequency loop antenna 11 and the high frequency loop antenna 12 may be coupled collectively with a single dual band transponder chip 15. This dual band transponder chip 15 may be operable in both the ultra-high frequency regime as well as in the high frequency regime and may—depending on the frequency regime—cooperate with the respective one of the loop antenna 11 and 12 for transmitting and receiving signals.

Figure 2F:
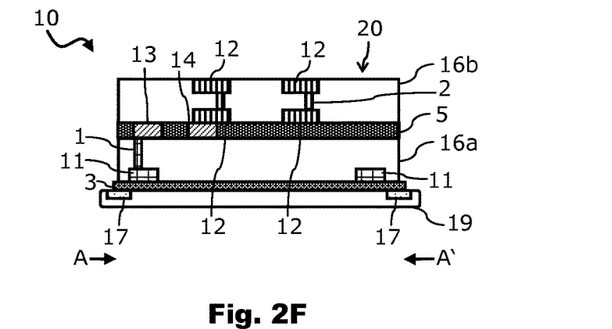
Figure 3:
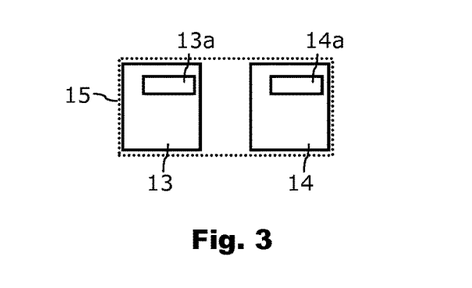
FIG. 3 illustrates a schematical block diagram of functional components of a transponder chip module for a dual band transponder according to another embodiment of the invention.

Alternatively, it is possible—as shown in FIGS. 2D to 2F—to provide a separate chip for each of the loop antennae 11 and 12. For example, the ultra-high frequency loop antenna 11 may be coupled to an ultra-high frequency transponder chip 13 and the high frequency loop antenna 12 may be coupled to a high frequency transponder chip 14. The lateral distance L between the two chips 13 and 14 on the surface of the carrier substrate 16 may be at least 8 mm in this regard, for example in order to be able to assemble the chips in two separate assembly processes without damaging the respective other chip.

As illustrated in FIGS. 2C and 2F, the carrier substrate 16 may also include at least two planar substrate layers that are stacked on top of each other. In this context the ultra-high frequency loop antenna 11 may for example be mounted on a first surface of a first substrate layer 16a of the at least two planar substrate layers of the carrier substrate 16. The high frequency loop antenna 12 may then be mounted on two opposite surfaces of a second substrate layer 16b of the at least two planar substrate layers of the carrier substrate 16. In FIGS. 2C and 2F the ultra-high frequency loop antenna 11 is illustrated as being mounted on the bottom surface of the first substrate layer 16a; it should, however, be understood that it may equally be possible—analogously to the variations of FIGS. 2B and 2E—to mount the ultra-high frequency loop antenna 11 on the top side of the first substrate layer 16a. In those cases the interlayer connection elements 1 either need to be implemented through only the second substrate layer 16b or may eventually be omitted altogether.

Just like in FIGS. 2C and 2F, the interlayer connection elements 2 are implemented through the second substrate layer 16b of the carrier substrate 16 so that respective parts of the high frequency loop antenna 12 on the first surface of the second substrate layer 16b are connected in an electrically conductive manner to parts of the high frequency loop antenna 12 on the second surface of the second substrate layer 16b.

Again, it may be possible to provide either a common dual band transponder chip 15 coupled to both ultra-high frequency loop antenna 11 and high frequency loop antenna 12 (cf. FIG. 2C) or to provide a separate ultra-high frequency transponder chip 13 and a separate high frequency transponder chip 14 which each couple to one of the loop antennae 11 and 12, respectively.

In the variation with the at least two substrate layers 16a and 16b it may be possible to insert an adhesive layer 5 between the two planar substrate layers of the carrier substrate 16. In turn, the dual band transponder chip 15 may then be embedded in this adhesive layer 5 and connected to the respective loop antennae from the bottom side and the top side of the individual substrate layers, respectively, in an electrically conduction fashion (cf. FIG. 2C). Alternatively, it may be possible to embed two separate chips such as the ultra-high frequency transponder chip 13 and the high frequency transponder chip 14 in the adhesive layer 5 (cf. FIG. 2F).

Figure 4:
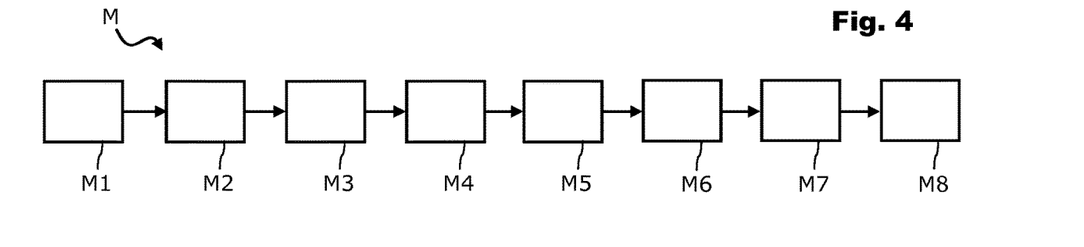
FIG. 4 an abstracted flow diagram of an exemplary method for manufacturing a textile label according to another embodiment of the invention.

FIG. 4 illustrates an abstracted flow diagram M for manufacturing a textile label. The method M may particularly be used for manufacturing a textile label 10 as explained in conjunction with FIG. 1. In the method M dual band transponders may be manufactured or be utilized, respectively, in particular dual band transponders 20 as explained in conjunction with the FIGS. 2A to 2F and FIG. 3.

In a first stage M1, an ultra-high frequency loop antenna 11 is mounted on a first surface of a carrier substrate 16 having at least one planar substrate layer. In a second stage M2, a high frequency loop antenna 12 is mounted on two opposite surfaces of the carrier substrate 16 so that the ultra-high frequency loop antenna 11 encloses the high frequency loop antenna 12 in a plane parallel to the at least one planar substrate layer entirely. The two stages M1 and M2 may in the course of the process be performed in switched order or essentially simultaneously.

Fully enclosing the high frequency antenna 12 by the ultra-high frequency antenna 11 means in this context having the electromagnetically effective passage area of the high frequency antenna 12 being entirely covered by the electromagnetically effective passage area of the ultra-high frequency antenna.

In a third stage M3, an ultra-high frequency transponder chip 13 is coupled to the ultra-high frequency loop antenna 11. In a fourth stage M4, a high frequency transponder chip 14 is coupled to the high frequency loop antenna 12. The two stages M13 and M4 may again be performed in switched order or essentially simultaneously.

In a fifth stage M5, a dipole antenna is knitted or woven into a textile label substrate 19, for example by using an electrically conductive antenna thread. The textile label substrate 19 may in particular be a knitted or woven textile fabric itself. The carrier substrate 16 with the ultra-high frequency loop antenna 11, the high frequency loop antenna 12, the ultra-high frequency transponder chip 13 and the high frequency transponder chip 14 is mounted onto the textile label substrate 19 in a sixth stage M6.

Optionally, it may be possible to store mutual mappings of the two chips in the respective other chip in a seventh stage M7 and in an eighth stage M8. In other words, it is possible to program an identification code—for example a tag identifier—for the ultra-high frequency transponder chip 13 in a memory 14a of the high frequency transponder chip 14, and to program an identification code—for example a unique identifier (UID)—for the high frequency transponder chip 14 in a memory 13a of the ultra-high frequency transponder chip 13. The respective memories 13a and 14a may be respective memory partitions of user accessible memory banks of the respective chips 13 and 14.

In the detailed description above, various features have been combined in one or more examples in order to improve the rigorousness of the illustration. It should be clear here, however, that the above description is of merely illustrative, but in no way restrictive, in nature. It serves to cover all alternatives, modifications and equivalents of the various features and exemplary embodiments. Many other examples will be immediately and directly clear to a person skilled in the art on the basis of the latter's technical knowledge in view of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" should not in principle exclude a plurality of features and components described in this way.

The invention claimed is:

1. A dual band transponder, comprising:
  a carrier substrate having at least one planar substrate layer;
  an ultra-high frequency loop antenna mounted on a top surface or a bottom surface opposite the top surface of the at least one planar substrate layers of the carrier substrate;
  a single high frequency loop antenna having a first part mounted on the top surface and having a second part mounted on the bottom surface opposite the top surface of the at least one planar substrate layers of the carrier substrate, the ultra-high frequency loop antenna enclosing the single high frequency loop antenna in a plane parallel to the at least one planar substrate layer.

2. The dual band transponder of claim 1, wherein the carrier substrate includes at least two planar substrate layers, and wherein the ultra-high frequency loop antenna is mounted on a top surface or a bottom surface of a first one of the at least two planar substrate layers of the carrier substrate and the single high frequency loop antenna is mounted on a top surface and a bottom surface opposite the top surface of a second one of the at least two planar substrate layers of the carrier substrate.

3. The dual band transponder of claim 2, further comprising:
first interlayer connection elements leading through the second one of the at least two planar substrate layers of the carrier substrate and electrically conductively connecting the second part of the single high frequency loop antenna on the bottom surface of the second one of the at least two planar substrate layers of the carrier substrate to the first part of the single high frequency loop antenna on the top surface of the second one of the at least two planar substrate layers of the carrier substrate.

4. The dual band transponder of claim 2, further comprising:
second interlayer connection elements leading through the first one of the at least two planar substrate layers of the carrier substrate.

5. The dual band transponder of claim 2, further comprising:
a dual band transponder chip coupled to the ultra-high frequency loop antenna and the single high frequency loop antenna.

6. The dual band transponder of claim 2, further comprising:
an ultra-high frequency transponder chip coupled to the ultra-high frequency loop antenna; and
a high frequency transponder chip coupled to the single high frequency loop antenna.

7. The dual band transponder of claim 5, wherein the dual band transponder further comprises second interlayer connection elements leading through the first one of the at least two planar substrate layers of the carrier substrate, the dual band transponder chip being coupled to the ultra-high frequency loop antenna by means of the second interlayer connection elements.

8. The dual band transponder of claim 7, wherein the second interlayer connection elements are further leading through the second one of the at least two planar substrate layers of the carrier substrate.

9. The dual band transponder of claim 5, further comprising: an adhesive layer applied between the first one of the at least two planar substrate layers of the carrier substrate and the second one of the at least two planar substrate layers of the carrier substrate, the dual band transponder chip or alternatively the ultra-high frequency transponder chip and the high frequency transponder chip being arranged in the adhesive layer.

10. The dual band transponder of claim 1, wherein the carrier substrate comprises exactly one planar substrate layer and wherein the ultra-high frequency loop antenna is mounted on the top surface or the bottom surface of the exactly one planar substrate layer and the single high frequency loop antenna is mounted on the top surface and the bottom surface of the exactly one planar substrate layer.

11. The dual band transponder of claim 10, wherein interlayer connection elements are leading through the exactly one planar substrate layer coupling the ultra-high frequency loop antenna and the single high frequency loop antenna to a dual band transponder chip.

12. The dual band transponder of claim 10, wherein interlayer connection elements are leading through the exactly one planar substrate layer, the ultra-high frequency loop antenna being coupled to a ultra-high frequency transponder chip, and the single high frequency loop antenna being coupled to a high frequency transponder chip.

13. The dual band transponder of claim 1, wherein the ultra-high frequency loop antenna and the single high frequency loop antenna are attuned to each other so that the operability of the ultra-high frequency loop antenna would be diminished if not for the presence of the single high frequency loop antenna.

14. The dual band transponder of claim 13, wherein the ultra-high frequency loop antenna alone is tuned to a center frequency of about 800 MHz and the single high frequency loop antenna is arranged in such a way that the ultra-high frequency loop antenna is detuned to a center frequency of about 900 MHz.

15. The dual band transponder of claim 1, wherein the surface area of the area of the dual band transponder in the plane of the planar substrate layers of the carrier substrate is less than 170 mm$^2$.

16. A textile label, comprising:
a textile label substrate; and
a dual band transponder mounted to the textile label substrate, the dual band transponder comprising:
a carrier substrate having at least one planar substrate layer;
an ultra-high frequency loop antenna mounted on a top surface or a bottom surface of the at least one planar substrate layers of the carrier substrate;
a single high frequency loop antenna having a first part mounted on a top surface and having a second part mounted on a bottom surface opposite the top surface of the at least one planar substrate layers of the carrier substrate, the ultrahigh frequency loop antenna enclosing the single high frequency loop antenna in a plane parallel to the at least one planar substrate layer entirely.

17. The textile label of claim 16, further comprising:
a dipole antenna knitted or woven into the textile label substrate.

18. The textile label of claim 17, wherein the ultra-high frequency loop antenna couples inductively to the dipole antenna.

19. The textile label of claim 16, wherein the dual band transponder is coated with a textile transfer adhesive and adhered to the textile label substrate via the textile transfer adhesive in a wash-proof manner.

20. The textile label of claim 16, wherein the carrier substrate of the dual band transponder comprises at least one of the materials from the group of polyethylene terephthalate, polyimide, FR4 and polyether ether ketone.

21. The textile label of claim 16, wherein the distance between the ultra-high frequency loop antenna and the single high frequency loop antenna is at least 0.8 mm.

22. A method for manufacturing a textile label, the method comprising:
mounting an ultra-high frequency loop antenna on a top surface or a bottom surface of a carrier substrate having at least one planar substrate layer;
mounting a first part of a single high frequency loop antenna on a top surface of the carrier substrate and mounting a second part of the high frequency loop antenna on a bottom surface opposite to the top surface of the carrier substrate so that the ultra-high frequency loop antenna encloses the single high frequency loop antenna in a plane parallel to the at least one planar substrate layer entirely;

coupling an ultra-high frequency transponder chip to the ultra-high frequency loop antenna;

coupling a high frequency transponder chip to the single high frequency loop antenna;

knitting or weaving a dipole antenna in a textile label substrate; and mounting the carrier substrate with the ultra-high frequency loop antenna, the single high frequency loop antenna, the ultra-high frequency transponder chip and the high frequency transponder chip onto the textile label substrate.

23. The method of claim 22, further comprising:

programming of an identification code for the ultra-high frequency transponder chip in a memory of the high frequency transponder chip; and programming of an identification code for the high frequency transponder chip in a memory of the ultra-high frequency transponder chip.

24. The dual band transponder of claim 6, wherein the dual band transponder further comprises second interlayer connection elements leading through the first one of the at least two planar substrate layers of the carrier substrate, the ultra-high frequency transponder chip being coupled to the ultra-high frequency loop antenna by means of the second interlayer connection elements.

25. The dual band transponder of claim 24, wherein the second interlayer connection elements are further leading through the second one of the at least two planar substrate layers of the carrier substrate.

\* \* \* \* \*